UNITED STATES PATENT OFFICE.

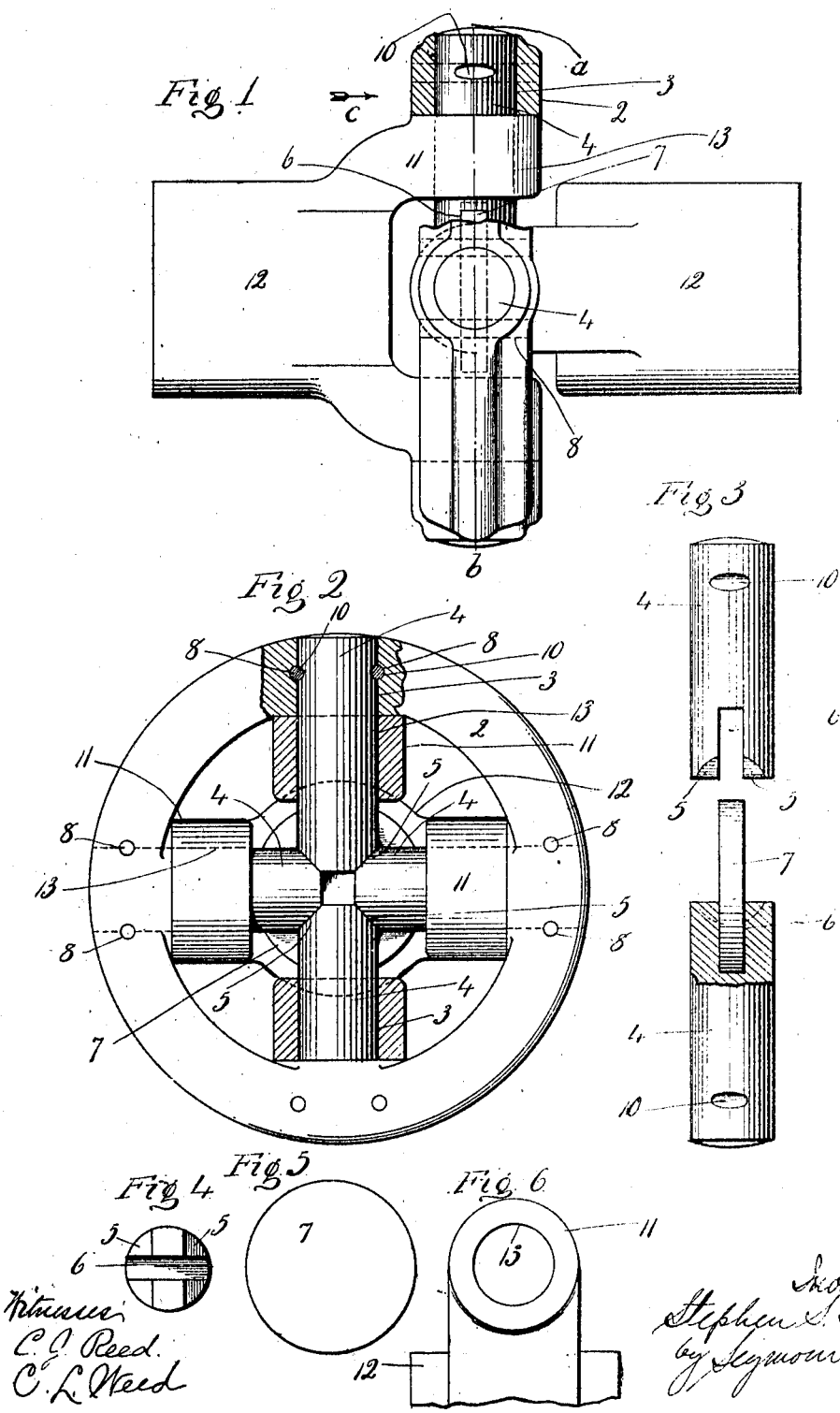

STEPHEN S. HALL, OF PORTLAND, CONNECTICUT, ASSIGNOR TO THE PICKERING GOVERNOR CO., OF PORTLAND, CONNECTICUT, A CORPORATION.

UNIVERSAL JOINT.

982,598.  Specification of Letters Patent.  Patented Jan. 24, 1911.

Application filed June 4, 1910. Serial No. 565,127.

*To all whom it may concern:*

Be it known that I, STEPHEN S. HALL, a citizen of the United States, residing at Portland, in the county of Middlesex and State of Connecticut, have invented a new and useful Improvement in Universal Joints; and I do hereby declare the following, when taken in connection with the accompanying drawings and the letters of reference marked thereon, to be a full, clear, and exact description of the same, and which said drawings constitute part of this specification, and represent, in—

Figure 1 a view in side elevation of a universal joint for transmitting motion constructed in accordance with my invention, a portion of the coupling-ring being broken away and shown in vertical section. Fig. 2 a view of the joint in vertical section on the line $a$—$b$ of Fig. 1 and looking in the direction of the arrow $c$, the heavy bearing pins, however, being shown in elevation. Fig. 3 a detail view showing two of the bearing-pins in elevation and the supporting disk which is inserted into longitudinal slots formed in their inner ends, the disk being shown in place in one of the pins, and the other pin being drawn away from it to better show its slot. Fig. 4 an end view of one of the pins looking at its inner end. Fig. 5 a detached plan view of the supporting washer. Fig. 6 a broken plan view of one of the yoke-arms of one of the joint members.

My invention relates to an improved universal joint designed with particular reference to being used in motor vehicles, such as automobiles and trucks, the object being to produce a simple, compact and convenient device constructed with particular reference to great strength.

With these ends in view my invention consists in certain details of construction and combinations of parts as will be hereinafter described and pointed out in the claims.

In carrying out my invention as herein shown, I employ a coupling-ring 2 made in one piece and formed with four radially arranged bearing-openings 3 open at their outer and their inner ends and all located in the plane of the ring and therefore having solid side walls. These openings 3 receive the outer ends of heavy bearing-pins 4 the outer ends of which are virtually flush with the periphery of the ring 2 and the inner ends of which are adapted to be supported each upon the other by forming them with suitable bevels. As shown each pin is formed with two bevels 5 standing at an angle of forty-five degrees to the axis of the pin. As shown also, the inner ends of the pins are formed with longitudinal slots 6 for the reception of a supporting and centering disk 7. I do not, however, limit myself to any particular way of supporting and reinforcing the inner ends of the bearing-pins 4 which in themselves are very heavy and amply supported at their outer ends in the ring 2. Nor do I limit myself to any particular method of securing the pins 4 in the ring 2. As shown they are secured in place by fastening pins 8 driven into holes 9 extending transversely through the ring, the pins taking into transverse notches 10 in the outer ends of the pins. As thus constructed and arranged the middle portions of the pins form heavy bearings or journals for the yoke-arms 11 of the joint-members 12, the said yoke-arms 11 being formed with circular openings 13 just large enough in diameter for the reception of the respective bearing-pins 4. It will be understood that the respective joint-members 12 with their yoke-arms are introduced into the ring 2 from the opposite sides thereof, one joint-member being turned a quarter turn with respect to the other, whereby the openings 13 in the yoke-arms 11 are registered with the respective bearing-pins 4 which are then introduced into the said openings and pushed home therein. The pins 4 are then fixed in place by means of the fastening-pins 8 or other devices.

My improved device reduces the number of parts to the minimum, and I am enabled on account of its simplicity, to employ very heavy bearing-pins 4 and to support them so solidly that the joint is able to transmit great power.

I claim:—

1. In a universal joint, the combination with a coupling-ring having radially arranged bearing-openings, of bearing-pins fastened at their outer ends in the said openings and having their inner ends slotted, a centering-piece introduced into the slots in the inner ends of the pins, and two joint-members formed with yoke-arms adapted to be inserted into the ring from the opposite sides thereof and receiving the middle portions of the bearing-pins.

2. In a universal joint, the combination with a coupling-ring having radially arranged bearing-openings, of bearing pins fastened at their outer ends in the said openings and having their inner ends slotted and beveled, and a centering-disk introduced into the slots in the inner ends of the said pins for centering and supporting their said inner ends, and two joint-members each having two yoke-arms formed with openings receiving the middle portions of the said pins.

In testimony whereof, I have signed this specification in the presence of two subscribing witnesses.

STEPHEN S. HALL.

Witnesses:
 GEO. C. PASCALL,
 H. SEXTON.